United States Patent [19]

Ledingham

[11] Patent Number: 5,692,596
[45] Date of Patent: Dec. 2, 1997

[54] RAIL GUIDE SUPPORT ASSEMBLY

[75] Inventor: Stuart J. Ledingham, Coto De Caza, Calif.

[73] Assignee: Valu Engineering, Inc., Irvine, Calif.

[21] Appl. No.: 539,673

[22] Filed: Oct. 5, 1995

[51] Int. Cl.[6] .................................................. B65G 21/20
[52] U.S. Cl. ................. 198/836.3; 403/396; 403/DIG. 9
[58] Field of Search ....................... 198/836.3; 403/396, 403/398, DIG. 9

[56] References Cited

U.S. PATENT DOCUMENTS

| 1,934,702 | 11/1933 | Fante | 403/396 |
|---|---|---|---|
| 4,470,499 | 9/1984 | Sijbrandij | 198/836.3 |
| 4,502,594 | 3/1985 | Sijbrandij | 198/836.3 |

OTHER PUBLICATIONS

ValuEngineering, *ValuGuide*® New Product Bulletin No. 30/135, Aug. 1993.
ValuEngineering, *ValuGuide*® New Product Bulletin No. 30.0A, May 1994.
ValuEngineering, *ValuGuide*® New Product Bulletin No. Unknown, May 1994.
ValuEngineering, *ValuGuide*® New Product Bulletin No. 30/138, May 1994.
ValuEngineering, *ValuGuide*® New Product Bulletin No. 10.4A, Jul. 1994.
ValuEngineering, *ValuGuide*® New Product Bulletin No. 30/154, Jan. 1995.
ValuEngineering *ValuGuide*® New Product Bulletin No. 30.0B, Apr. 1995.
ValuEngineering, *ValuGuide*® New Product Bulletin No. 30.1A, Apr. 1995.
Nolu Plastics, Inc., Catalog No. 300, "Attachment Brackets", 1986.
Beck + Co. GMBH, *Transport and Conveyor Systems Bottling and Canning*, p. 4

Primary Examiner—Joseph E. Valenza
Attorney, Agent, or Firm—Knobbe, Martens, Olson & Bear, LLP

[57] ABSTRACT

A rail guide support assembly for assembly line and conveyor systems utilizes a split support rod which allows convenient visual confirmation of the positioning of the guide rails. The rod comprises two halves formed longitudinally, and a portion of the rod mates to form an indicator of the guide rail position relative to the conveyor belt and path of the product being conveyed. Adjustable positioning in multiple directions is possible, such that one or more guide rails may be differentially spaced both vertically above and laterally along the conveyor belt. The split rod may also incorporate a contoured design which keys the halves together to facilitate their assembly.

22 Claims, 4 Drawing Sheets

1

RAIL GUIDE SUPPORT ASSEMBLY

BACKGROUND OF THE INVENTION

1. Field of the Invention

The present invention relates to support assemblies used in assembly line and conveyor belt systems. In particular, the rail guide support assembly of the present invention facilitates the guided transport of objects down a predetermined path.

2. Description of the Related Art

Manufacturers commonly utilize conveyor systems in processing, packaging, and assembly lines in which a product travels on a track or belt and is transported through or between various manufacturing procedures. Guide rails are provided to maintain the desired direction of travel, to maintain specific positioning of the product during a procedure, and/or to prevent lateral movement which may result in the product falling off the belt.

Rail guide support assemblies are utilized on each side of the conveyor belt structure to align one, two, or more guide rails which are spaced apart vertically along the predetermined path. Usually, pairs of assemblies are located across from each other along the conveyor belt structure. Typically, brackets are attached to the sides of the conveyor belt structure, and support rods are mounted to the brackets. Clamps are secured to the support rods, and the clamps position and support the guide rails.

Presently, when two guide rails are desired on each side of the conveyor belt, an assembly comprising an adjustable rod with a clip of fixed dimension is typically utilized to support the rails. The rod is mounted to the support rod attached to the bracket and may be adjusted along its length to laterally position the clip and guide rails along a conveyor belt. The vertical spacing of the guide rails is fixed by the length or spread of the clip, which is attached to the end of the rod by a cap screw. Thus, clips of several spread sizes must be kept in inventory if the manufacturing requirements include difference relative heights of the guide rails.

Yet another assembly used to support two guide rails comprises a support rod used with a flat, slotted bar. This bar supports upper and lower clamps and guide rails in various vertical positions. This assembly, however, retains the aforementioned limitation of possibly undetected rotation of the rod in the bracket, and thus detrimental misalignment of the guide rails on the conveyor system.

In addition, cross blocks allow a clamp and guide rail to be mounted at a different lateral position along the conveyor path. That is, a cross block is mounted to a vertical support rod which may also support a clamp and guide rail at a first lateral position. A second cross block is mounted to the support rod to hold a second clamp and guide rail.

SUMMARY OF THE INVENTION

A rail guide support assembly constructed in accordance with the present invention overcomes limitations of the assemblies which are presently used to grip and support guide rails in conveyor belt systems. The support assembly of the present invention advantageously offers adjustable positioning in multiple directions for one or more clamps and guide rails while simultaneously providing convenient, visual verification of the alignment of the guide rails.

In a preferred embodiment, the rail guide support assembly comprises a bracket for mounting to the conveyor belt structure and an adjustable support rod for attachment of upper and lower clamps to position and support upper and lower guide rails, respectively. Preferably, an eye ring and adjusting knob are utilized to secure the support rod in the bracket.

An important feature of the support rod constructed in accordance with the present invention is a longitudinal split design, with substantially identical halves mating along at least a portion of the length of the rod. This mated portion of the rod forms an indicator of the horizontal positioning of the guide rails, since the line created by the mating of the two halves of the rod, as viewed from the mated end of the rod, is substantially parallel to the guide rail position. Thus, visual inspection of this end readily indicates whether the support rod has rotated in the bracket and thus whether rotation by the guide rails from the desired position has occurred. In one embodiment, the line formed by the mated halves of the rod is straight; although, it may alternately be curved or angled to form various shapes yet still indicate the corresponding guide rail position.

Another important feature of the support assembly of the present invention is increased vertical and lateral control of the guide rail positions. Divergent portions or legs of the support rod extend upwardly and downwardly from the mated, horizontal portion of the rod, and the clamps attached thereto allow vertical adjustment of the guide rails to achieve variable heights above the conveyor belt.

Yet another important feature afforded by the split design of the support rod is the capability of laterally positioning the upper leg further across the conveyor belt than the lower leg, thus providing more controlled guidance of tapered products, such as plastic laundry soap bottles. Alternately, the lower leg of the rod may be extended further than the upper leg where the product is tapered at its lower end.

In alternate embodiments, more or less clamps and guide rails may be secured to one or both of the legs of the support rod. Thus, a single support assembly can accommodate guide rails for products of all sizes, tall or short, straight-sided or tapered.

A preferred method of positioning upper and lower clamps and guide rails on a support assembly for a conveyor belt system comprises:

a) mating two halves of an adjustable support rod, where the halves cooperate to form a cylindrical portion of the rod;

b) inserting a desired length of each half of the cylindrical portion in a bracket of the assembly;

c) securing the cylindrical portion in the bracket such that the mated surfaces of the rod halves form a plane which is substantially parallel to the conveyor belt;

d) fastening one clamp and guide rail to the upwardly extending portion of the rod to attain an upper guide rail position; and e) fastening another clamp and guide rail to a downwardly extending portion of the rod to attain a lower guide rail position, where the guide rail positions are determined by manufacturing requirements of the conveyor belt system.

In this method, Steps a)–e) may be performed in any order, and the adjustment of the guide rail positions is performed in three directions.

Further advantages and applications will become apparent to those skilled in the art from the following detailed description and the drawings referenced herein.

DETAILED DESCRIPTION OF THE PREFERRED EMBODIMENTS

Figure 1:
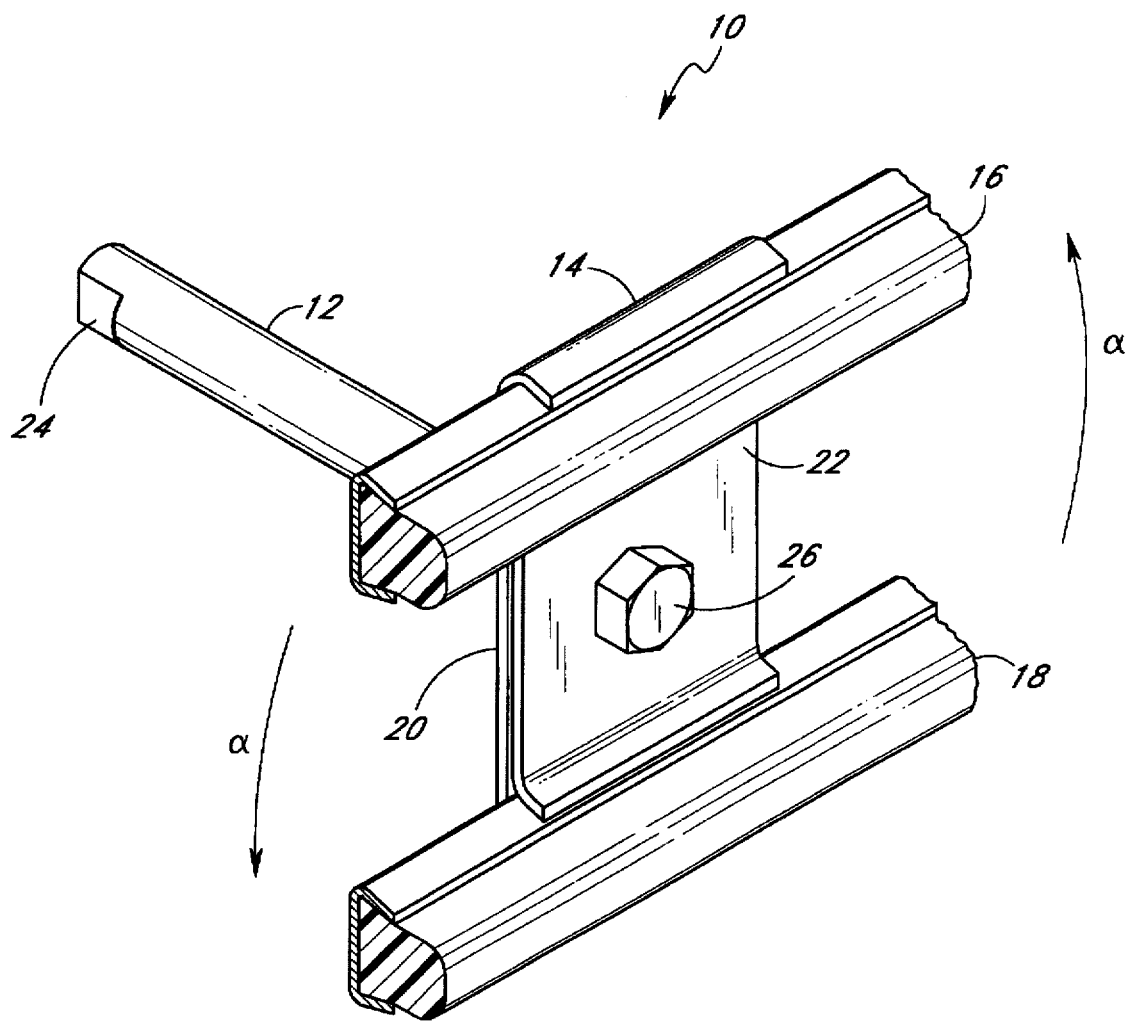
FIG. 1 is a perspective view of a prior art rail guide support assembly comprising a rod and a clip.

A typical rail guide support assembly used in assembly lines and conveyor systems is illustrated in perspective in FIG. 1 and generally referenced by the numeral 10. The conveyor system 10 generally comprises a cylindrical rod 12, a clip 14, and two guide rails 16, 18. The clip 14 comprises inner and outer brackets 20, 22 which grip the guide rails 16, 18 in a fixed vertical arrangement. The brackets 20, 22 are generally C-shaped in cross-section, and are formed from generally rectangular metal material.

The rod 12 is generally of ½" or ⅝" diameter to be used with conventional brackets or support rods which are mounted at the sides of a conveyor belt system (not shown). The rod 12 may include wrench flats 24 on a distal end thereof, and is fastened at a proximal end thereof to the clip 14 using a cap screw 26. After assembly of the clip 14 to the rod 12, the wrench flats 24 may be at any angle relative to the sides of clip 14.

Thus, while the mounting of the rod 12 to the conveyor belt system includes lateral adjustment of the pair of guide rails 16, 18, across the conveyor belt, the rod 12 does not afford any indication of the rotational position α of the guide rails in a vertical plane about the longitudinal axis of the rod 12. Also, the pair of guide rails 16, 18 are aligned in the same lateral position along the conveyor belt, which is useful when the product conducted along the belt has uniformly vertical or straight sides, but is disadvantageous for use with tapered products having nonvertical side walls.

Further, the vertical distance between the guide rails 16, 18 is determined by the size or spread of the clip 14. Therefore, an inventory of several spread sizes of clips must be maintained when a manufacturer utilizes processing, packaging, and assembly lines or conveyor systems requiring a variety of relative guide rail heights for manufacturing products.

Figure 2:
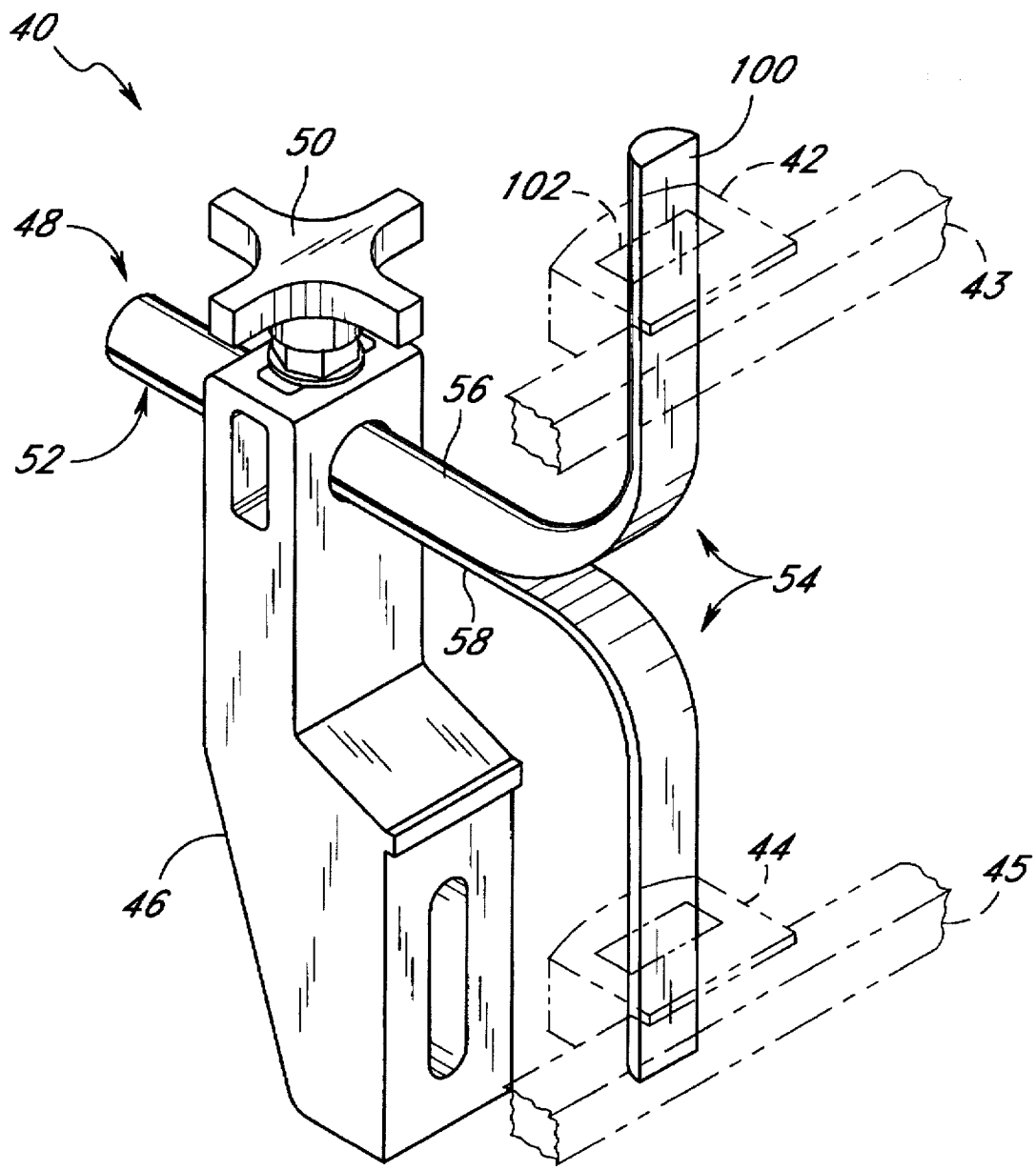
FIG. 2 is a perspective view of a rail guide support assembly constructed in accordance with the present invention, with clamps and guide rails illustrated in phantom.

A preferred embodiment of a rail guide support assembly constructed in accordance with the present invention is illustrated in FIG. 2 and generally referenced by the numeral 40. Conventional guide rail clips 42, 44 and guide rails 43, 45 are shown in phantom as they would be mounted to the assembly 40. The assembly 40 comprises a bracket 46 for mounting to the conveyor belt structure (not shown), a longitudinally split support rod 48, and an adjusting knob 50 for securing the rod 48 to the bracket 46. These components of the assembly 40, and, in particular, the rod 48, are shown more clearly in an exploded view in FIG. 3.

FIG. 2 shows the rod 48 with a mated portion 52 and divergent portions 54. Preferably, the divergent portions 54 form a 90° angle with the mated portion 52. The divergent portions 54 extend upwardly and downwardly from the mated portion 52 of the rod 48, which is mounted in the bracket 46. In this preferred embodiment, an upper half 56 of the rod 48 is identical in shape and length to a lower half 58, and the mated portion 52 is cylindrical. In alternate embodiments, either half 56 or 58 of the rod 48 may have its mated portion 52 and/or its divergent portion 54 longer than the other portion 52/54 of the other half 56 or 58, respectively. Also, the mated portion 52 may be hexagonal, or the rod 48 may have other outer shapes, as will be readily understood by those of skill in the art.

Figure 4A:
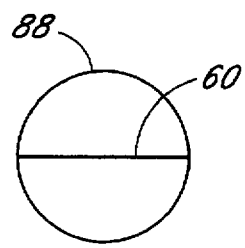
FIGS. 4a–4e are various end views of a cylindrical mated portion of an adjustable support rod of FIG. 2, illustrating various mating surface configurations.

The demarcation of the two halves 56, 58 in the mated portion 52 of the rod 48 is seen in FIG. 2. Referring in detail to FIG. 4a, which shows an end view of the mated portion 52 of the rod 48, the straight or flat contour of the mating surfaces of the upper half 56 and lower half 58 of the rod 48 form a line 60 which may be used as an indicator of the positions of the guide rails. As indicated in FIG. 2, the guide rail positions are substantially parallel to the plane formed by the mated surfaces of the two rod halves 56, 58.

Rail Guide Support Assembly

Figure 3:
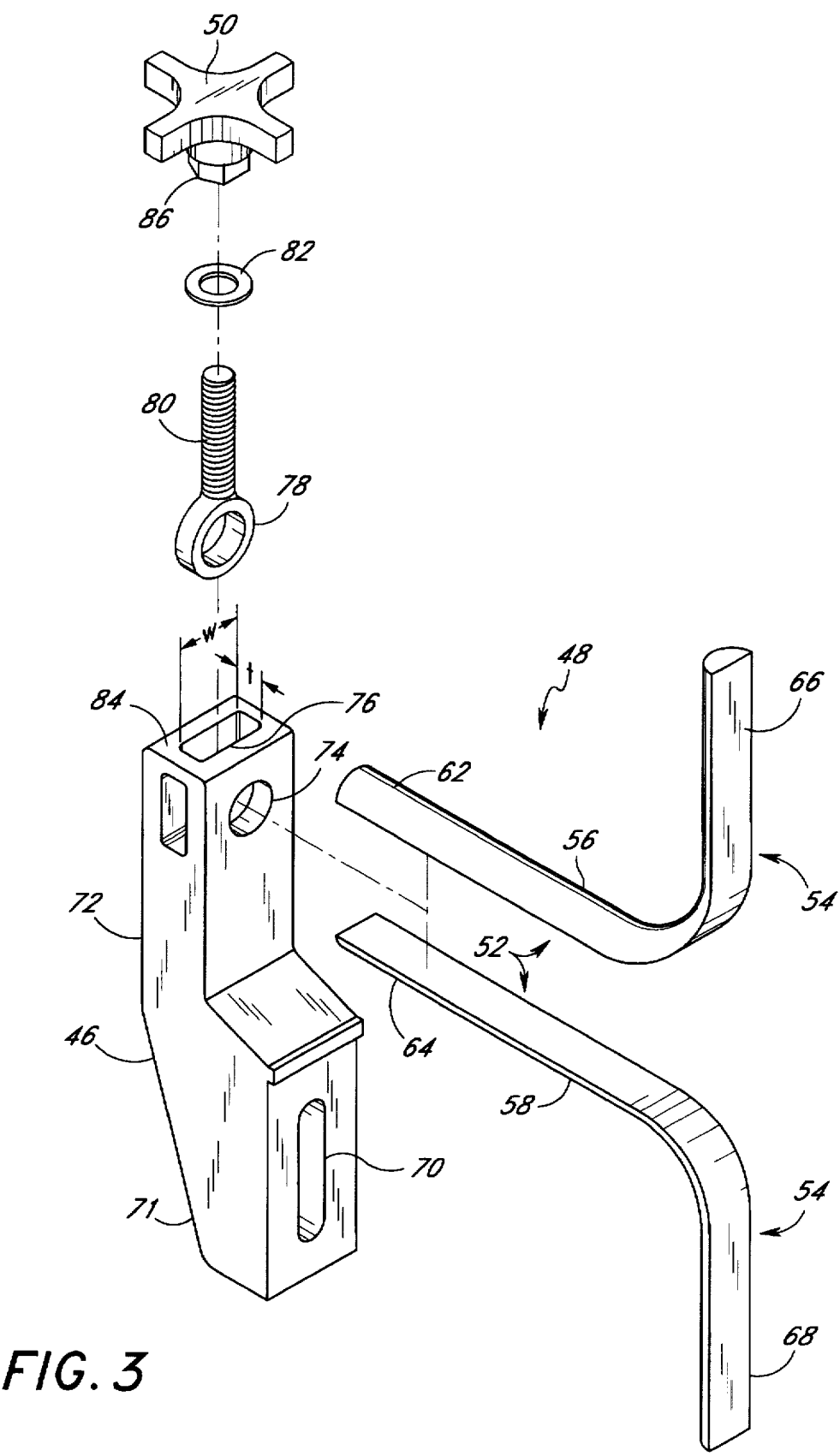
FIG. 3 is an exploded view of the support assembly of FIG. 2.

Referring now to FIG. 3, the separated halves 56, 58 of the rod 48 are more clearly illustrated. The preferred material of the rod is 303 or 304 stainless steel, and the mated rod diameter is preferably ½" or ⅝"; although, other materials and diameters are contemplated by the present invention. The resultant cross-sectional dimensions of the rod halves 56, 58 are well within the usual slot sizes of the clamps 42, 44 (FIG. 2) which are secured to the divergent portions 54 of the rod 48. Therefore, conventional clamps may be utilized with the assembly 40.

Referring to FIG. 3, distal segments 62, 64 of rod 48, which together form the mated portion 52 of the rod 48, are shown longer than proximal portions 66, 68 of rod 48. However, in alternate embodiments one or both vertical portions 66, 68 may be longer than the horizontal segments 62, 64. And, as will be discussed in greater detail below, one of the horizontal segments 62 or 64 may be longer than the other for differential lateral positioning. Also, if desired, the mating surface of each half 56, 58 may include stamped or etched calibration markings to aid in the lateral positioning of the guide rails 43, 45 (FIG. 2) along the conveyor belt.

The bracket 46 of the assembly is shown in FIG. 3 with a slot 70 on its lower end 71 for mounting to the conveyor belt structure using conventional fasteners. It is preferred to have the bracket 46 fastened to the structure such that its rotation about a vertical axis is prevented. The bracket 46 includes an upper end 72 which preferably extends away from the conveyor belt structure. The upper end 72 also includes an aperture 74 for receiving the support rod 48. Other bracket shapes having additional apertures or slots may be utilized while still enjoying the advantages of the present invention. The bracket body is preferably reinforced polyamide; although, other durable materials may be used.

A slot 76 on the upper end 72 of the bracket 46 allows an eye ring 78 to be inserted such that the ring 78 aligns generally with the aperture 74. The slot width w is greater than the ring outer diameter, and the ring inner diameter is greater than the rod diameter, which is typically ½" or ⅝".

A threaded shaft 80 of the eye ring 78 has a diameter less than the slot thickness t. A washer 82 may be placed between an upper face 84 of the bracket 46 and a bushing 86 on the knob 50 when the ring 78 is inserted into the slot 76. Rotation of the knob 50 results in a tightening of the ring 78 against the rod 48 and the rod 48 against the upper surface of the aperture 74 in the body 46, thereby securing the rod 48 in the aperture 74 of the bracket 46. Preferably, the ring 78 and washer 82 are stainless steel, the knob bushing 86 is nickel plated brass, and the knob body 50 is reinforced polyamide. It is understood, however, that other materials may be used, as well as other fastening methods for securing the rod 48 to the bracket 46, which are known to those of ordinary skill in the art. For example, a nut may be used in place of knob 50.

Figure 4B:
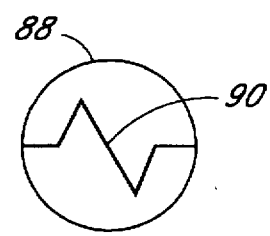
Figure 4C:
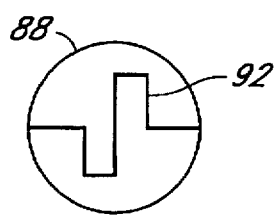
Figure 4D:
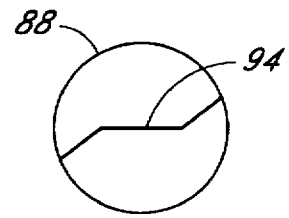
Figure 4E:
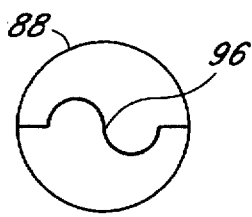
Figure 4F:
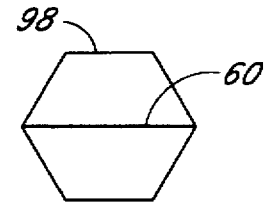
FIGS. 4f–4j are various end views of a hexagonal mated portion of an adjustable support rod of FIG. 2, illustrating various mating surface configurations.
Figure 4G:
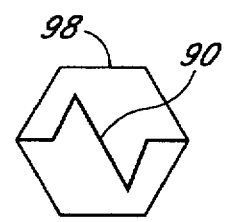
Figure 4H:
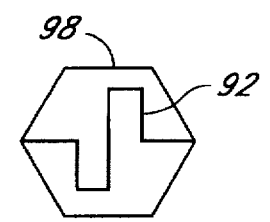
Figure 4I:
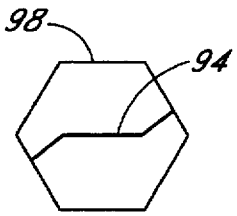
Figure 4J:
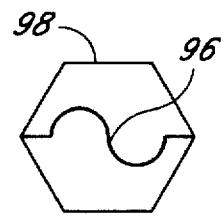

FIGS. 4a–4e illustrate various possible end views of the mated portion of a cylindrical rod 88 constructed in accordance with the present invention. In FIG. 4a, the mating surfaces of the rod are flat, and the resultant end view, as well as cross-sectional view, of the rod's mated portion forms the straight line 60. In FIG. 4b, an angular, multi-sloped design 90 similar to a sine wave is formed by the mating surfaces, while FIG. 4c shows an inverted square wave design 92 formed by the surfaces. FIG. 4d illustrates a possible double ramp design 94 and FIG. 4e illustrates a sine wave 96.

FIGS. 4f–4j illustrate various possible end views of the mated portion of a hexagonal rod 98 constructed in accordance with the present invention. The end views of FIGS. 4f–4j correspond generally to FIGS. 4a–4e, respectively. The non-flat mating surfaces of FIGS. 4b–4e and FIGS. 4g–4j are preferably limited to the mated portion of the rod 88 or 98. That is, a proximal face 100 of each divergent portion 54, as illustrated in FIG. 2, should be flat to better fit into a slot 102 of the clamps 42, 44.

The angled and curved designs illustrated in FIGS. 4b–4e and FIGS. 4g–4j are shown as examples of possible contours which may aid in mating the rod halves 56, 58 for insertion into the bracket 46. The illustrated designs provide rod halves which are identical; although, other shapes which provide guidance in quickly assembling the rod may be utilized by the present invention. It should be noted that each of these designs incorporates at least one linear component into the pattern which is used for the visual alignment of the guide rails. As will be easily understood by those of skill in the art, various rods 48 may be utilized in connection with the present invention having various end or cross-sectional configurations.

Method of Supporting Guide Rails

In the present invention, a preferred method of supporting guide rails used in assembly line and conveyor systems provides visual confirmation of the guide rail positions. This preferred method of positioning upper and lower clamps and guide rails on a support assembly 40 for a conveyor belt system comprises:

a) mating two halves 56, 58 of an adjustable support rod 48, where the halves 56, 58 cooperate to form a cylindrical portion 52 of the rod 48;

b) inserting a desired length of each half 56, 58 of the cylindrical portion 52 in a bracket 46 of the assembly 40;

c) securing the cylindrical portion 52 in the bracket 46 such that the mated surfaces of the rod halves 56, 58 form a plane which is substantially parallel to the conveyor belt;

d) fastening one clamp 42 and guide rail 43 to the upwardly extending portion 66 of the rod 48 to attain an upper guide rail position; and e) fastening another clamp 44 and guide rail 45 to a downwardly extending portion 68 of the rod 48 to attain a lower guide rail position, where the guide rail positions are determined by the manufacturing requirements of the conveyor belt system.

In this method, Steps a)–e) may be performed in any order, and the adjustment of the guide rail positions is performed in three directions. That is, the mated portion 52 of the rod 48 may be rotated by any angle α, thereby rotating each guide rail 43, 45 in a vertical plane, with the line 60, visible at the end of the rod, indicating the angular orientation of the guide rails. Generally, this angle will correspond to a rail position that is zero degrees from the horizon; thus, this line indicator 60 is a convenient way of determining when the rod 48 has rotated and the guide rails 43, 45 are not in their proper position.

Further, the guide rails 43, 45 may be adjusted vertically to different heights above the conveyor belt. Optionally, more than one clamp and guide rail may be secured on each divergent portion of the rod, either upward or downward of the mated portion. The guide rails 43, 45 may also be laterally positioned along the belt by adjusting the upper or lower rod half accordingly, and securing the rod 48 in the bracket 46. Markings on the mating surfaces of the rod halves 56, 58 may be used to aid in the lateral positioning of the upper and lower portions 66, 68. Or, a rod utilizing different lengths of upper and lower portions may be used to obtain the different guide rail positions.

Thus, the rail guide support assembly 40 constructed in accordance with the present invention affords several advantages over those presently in use. Some of these advantages are the convenience of the alignment indicator on the rod, the multiple vertical guide rail positions, and the multiple lateral guide rail positioning provided by the adjustable rod. The assembly 40 also reduces the types of components that a manufacturer must maintain, by reducing the need for cross blocks and rod and slotted bar assemblies.

The embodiments illustrated and described above are provided merely as examples of the rail guide support assembly constructed in accordance with the present invention. Other changes and modifications can be made from the embodiments presented herein by those skilled in the art without departure from the spirit and scope of the invention, as defined by the appended claims.

What is claimed is:

1. A rail guide assembly for supporting a clamp for gripping a guide rail, comprising:

a bracket; and an adjustable support rod having two halves formed longitudinally, said rod having a mated portion and divergent portions such that said mated portion is mounted in said bracket and said divergent portions are adapted for adjustable positioning of said clamp, said mated portion being approximately orthogonal to said divergent portions;

whereby proper horizontal positioning of said guide rail is verified by visual assessment of mating surfaces of said rod halves at an end of said mated portion, wherein either one of said divergent portions supports said clamp such that a desired vertical position of said guide rail is maintained.

2. The assembly of claim 1, wherein a different length of each of said rod halves between said bracket and said divergent portions is secured by said bracket.

3. The assembly of claim 1, wherein said rod halves are approximately identical in shape and length.

4. The assembly of claim 1, wherein said divergent portions support upper and lower clamps and guide rails.

5. The assembly of claim 1, wherein said rod halves are semi-cylindrical such that said mated portion of said rod is cylindrical.

6. The assembly of claim 1, wherein said mated portion of said rod is hexagonal.

7. The assembly of claim 1, wherein said bracket includes an aperture for receiving said mated portion of said rod, an eye ring having an opening substantially aligned with said aperture, and an adjusting knob for securing said rod in said bracket.

8. The assembly of claim 1, wherein said mating surfaces are flat.

9. The assembly of claim 1, wherein said mating surfaces include angles.

10. The assembly of claim 1, wherein said mating surfaces include curves.

11. A support rod for mounting in a bracket and for use with a clamp for a guide rail, comprising:

two halves of said rod formed longitudinally; and a mated portion and divergent portions of said rod, said mated portion adapted to be mounted in said bracket, at least one of said divergent portions adapted to support said clamp, said mated portion approximately orthogonal to said divergent portions;

wherein vertical positioning of said divergent portions is visually confirmed from viewing from an end of said mated portion the horizontal alignment of mating surfaces of said halves.

12. The assembly of claim 11, wherein said halves are approximately identical in shape.

13. The assembly of claim 11, wherein said mated portion and said divergent portions are substantially the same length.

14. The assembly of claim 11, wherein said divergent portions support upper and lower clamps and guide rails.

15. The assembly of claim 11, wherein said halves are semi-cylindrical such that said mated portion of said rod is cylindrical.

16. The assembly of claim 11, wherein said mated portion of said rod is hexagonal.

17. The assembly of claim 11, wherein said mating surfaces are straight.

18. The assembly of claim 11, wherein said mating surfaces include angles.

19. The assembly of claim 11, wherein said mating surfaces include curves.

20. A method of supporting a first and second clamp for gripping an upper and a lower guide rail, respectively, in a conveyor belt system, comprising:

a) mating two halves of an adjustable support rod, said halves cooperating to form a first portion of said support rod;

b) inserting a desired length of each of said halves of said first portion in a bracket mounted on said system;

c) securing said first portion to said bracket such that mating surfaces of said rod halves form a plane which is substantially parallel to a belt of said system when viewed from an end of said support rod;

d) fastening said first clamp and said upper rail to an upwardly extending second portion of said support rod at a first position; and e) fastening said second clamp and said lower rail to a downwardly extending second portion of said support rod at a second position, said first and second portions of said rod being in orthogonal relation, and said first and second positions determined by requirements of said system;

wherein steps a)–e) may be performed in any order such that adjustment of said clamps and guide rails is provided in three directions.

21. The method of claim 20, wherein said first clamp and said upper rail are positioned distal to said second clamp and said lower rail.

22. The method of claim 20, wherein said second clamp and said lower rail are positioned distal to said first clamp and said upper rail.

* * * * *